United States Patent [19]

Hogenesch

[11] 4,155,466
[45] May 22, 1979

[54] TRANSFER MECHANISM

[75] Inventor: Johannes H. L. Hogenesch, Aalten, Netherlands

[73] Assignee: Staalkat B.V., Aalten, Netherlands

[21] Appl. No.: 788,922

[22] Filed: Apr. 19, 1977

[30] Foreign Application Priority Data

Apr. 22, 1976 [NL] Netherlands .......................... 7604272

[51] Int. Cl.² ............................................. B65G 47/90
[52] U.S. Cl. .................................. 414/609; 198/750; 414/21; 414/680
[58] Field of Search ........................ 198/485, 621, 750; 214/2, 1 R, 1 B, 1 BB, 1 BD, 1 P, 147 T, 1 PB, 1 QG, 1 Q; 177/145, 147

[56] References Cited

U.S. PATENT DOCUMENTS

| 2,481,440 | 9/1949 | Page | 209/516 |
| 3,679,072 | 7/1972 | Mueller | 214/6 BA |
| 3,687,259 | 8/1972 | Van Der Winden | 198/485 X |
| 3,776,397 | 12/1973 | Hoy et al. | 214/1 BB X |
| 4,032,019 | 6/1977 | Noll | 214/1 QG |

FOREIGN PATENT DOCUMENTS

| 42293 | 3/1970 | Finland | 214/1 P |
| 951740 | 3/1964 | United Kingdom | 214/1 QG |

Primary Examiner—Frank E. Werner
Attorney, Agent, or Firm—Cushman, Darby & Cushman

[57] ABSTRACT

A transfer mechanism for transferring successively fed objects to a station, from which the objects can be taken one by one. On the station a holder is present, substantially comprising two wall-shaped holder portions each supporting one object, at least one portion being adapted to perform a translatory and rotary movement.

13 Claims, 8 Drawing Figures

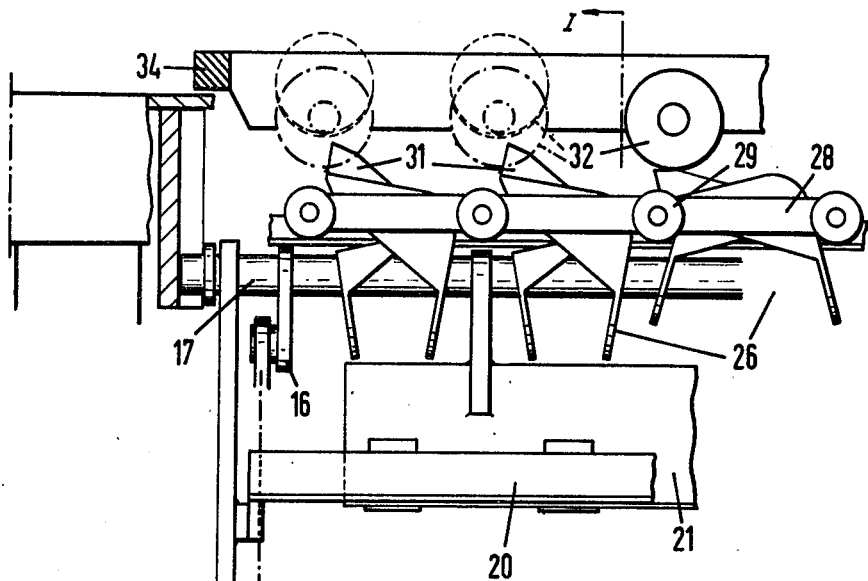
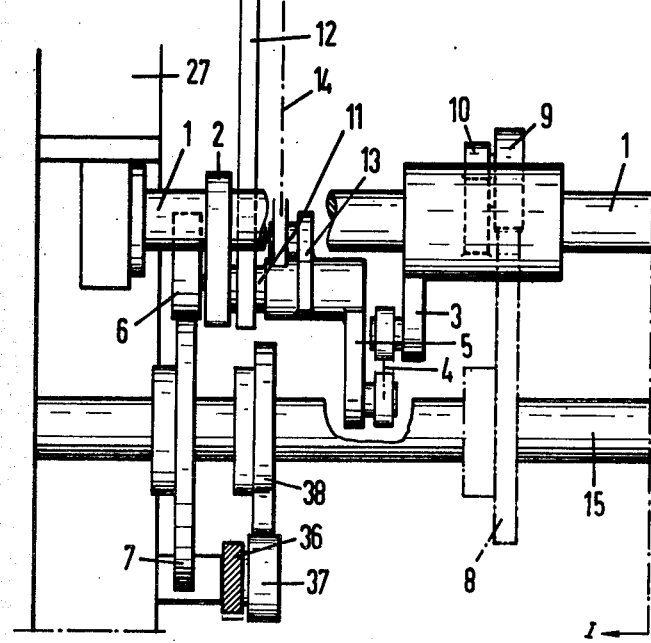
FIG. 2

TRANSFER MECHANISM

The present invention relates to a transfer mechanism for transferring successively fed objects to a station, from which the objects can be taken one by one.

BACKGROUND OF THE INVENTION

In such an apparatus, which is especially designed to transfer eggs, the eggs are moved towards and away from a scale by means of a star wheel arranged above the scale. When the eggs are "wiped" from the scale, they are moved by the star wheel onto a plate which is inclined at a small angle to the horizontal, over which plate the eggs can move to the extent that they come within the reach of a gripper device or the like. However, owing to the particular shape of an egg, its movement over said plate will not be rectilinear but oscillatory, so that the "axial rest position" of the egg on the plate is not fixed and consequently problems are encountered during further handling, in this instance the engagement by the gripper device or the like for transferring the egg to, for instance, a carrier.

SUMMARY OF THE INVENTION

The object of the present invention is to remove these drawbacks. Therefore, the transfer mechanism of the type described above is characterized in that on the station a holder is present, substantially comprising two wall-shaped holder portions each for supporting one object at a time, at least one portion being adapted to perform a translatory and rotary movement.

The rotary holder portion on the feed side of the objects can perform at least part of the rotary movement in the feed path of the objects to the station and extend between said object and the subsequent object at the latest upon arrival of an object at the station. Thus it is achieved that said rotary holder portion ensures both the gradual discharge of an object and the gradual feeding of a subsequent object. It will be clear that this is very important if the transfer apparatus is used for handling eggs, wherein the station is formed by a weighing machine. For as a result of the discharge of a weighed egg simultaneously with the feeding of a subsequent egg a maximum weighing time is achieved.

In one embodiment of the invention the translatory movements of the two holder portions can be coupled. To this end, one portion can be secured and the other portion can be hinged to a reciprocal vertical rod. If both portions can rotate, the rotary movements can be coupled.

To perform the rotary and translatory movements, use can be made of cam discs. This has the advantage that the movements need not be absolutely rectilinear or rotary. Moreover, partial movements of the cycle can overlap, owing to which the cycle time can be reduced.

Another advantage of the apparatus according to the invention is that the rotary holder portion need not truly rotate, but can follow a curve adapted to eggs.

A great advantage of the transfer mechanism according to the invention over prior apparatus of this type, used for handling eggs, is that in the apparatus according to the invention each egg only needs to be moved a short distance from the weighing scale before the egg is picked up for a translatory movement between the holder portions.

To achieve smooth handling of the objects the holder portion on the feed side of the objects can have a bent configuration on the feed side of the objects. This bent part ensures smooth running of the objects onto the scale.

BRIEF DESCRIPTION OF THE DRAWINGS

The invention will now be elucidated in more detail with reference to the drawings showing one embodiment of the transfer mechanism by way of example. In said drawings

FIG. 2 is a side elevational view of the apparatus shown in FIG. 1;

DETAILED DESCRIPTION

Figure 1:
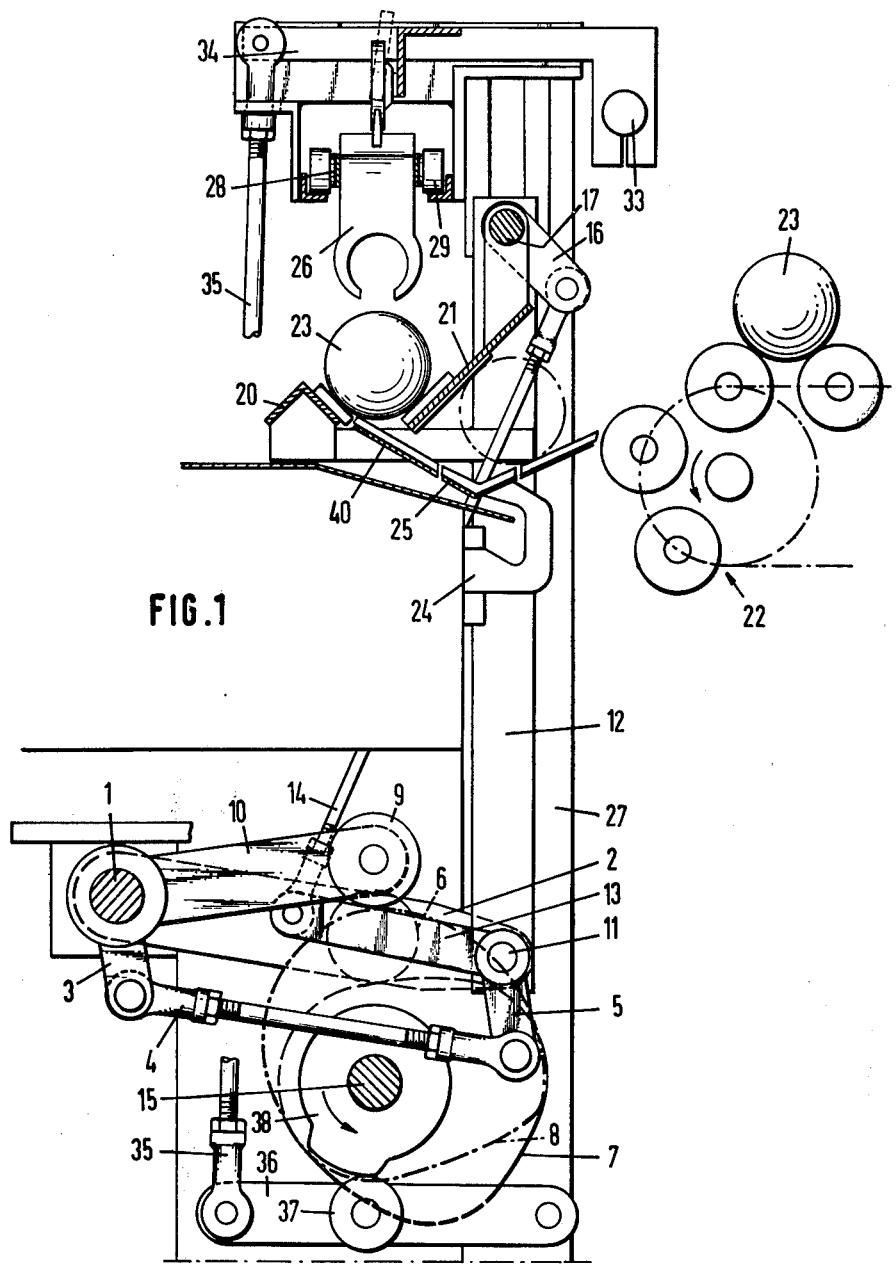
FIG. 1 is a front elevational view of a first embodiment of the transfer mechanism according to the invention.

As depicted in FIGS. 1-5, a transfer mechanism for discharging eggs from a weighing device to, for instance, a carrier comprises an exclusively vertically reciprocal holder portion 20 and a holder portion 21 adapted to perform both a vertically reciprocal movement and a rotary movement. After being received by a receiving means such as a weighing device 24 including a weighing scale 25, the eggs 23 coming from a diagrammatically shown intermittently driven roller conveyor 22 are "wiped" out of weighing scale 25 over a fixed guideway portion 40 through rotation of holder portion 21, and moved between holder portions 20 and 21, which are subsequently jointly moved upwardly to move the eggs into carriers 26. Holder half 21 is rotated back therein and moved downwardly together with the other holder half, whereupon the cycle described above (see in this connection the upper part of FIGS. 1, 3, 4 and 5) is repeated.

To perform the above movements of shaft 1 is mounted for rotation in a frame 27.

The shaft includes two levers 2 and 3, on the free ends of which are hingedly engaged levers 4 and 5, which with their other ends are hingedly interconnected, thus forming a hinged parallellogram including levers 2, 3, 4, 5.

Mounted on lever 2 is a cam follower roller 6 actuated by a cam disc 7 mounted on a driven shaft 15.

A second cam disc 8 mounted on said shaft 15 cooperates with a cam follower roller 9 mounted on the end of a lever 10, the other end of which is hinged around shaft 1 but secured to lever 3.

Levers 2 and 5 are hinged together by a shaft 11 mounted on a rod 12 passed vertically into frame 27. Mounted for rotation around shaft 11, but secured to lever 5 is furthermore a lever 13, to the other end of which a lever 14 is hingedly connected.

Lever 14 is again hinged to a lever 16, which is adapted to rotate around a shaft 17 attached to rod 12.

The holder half 20 is secured to rod 12, while holder half 21 is mounted for rotation on rod 12 via shaft 17, but secured to lever 16.

FIGS. 1, 3, 4 and 5 show the various parts in their mutual position during four phases of the cycle:

FIG. 1 shows the apparatus after holder portion 21 has "wiped" an egg 23 from scale 25 and moved to egg between holder halves 21 and 20.

Figure 3:
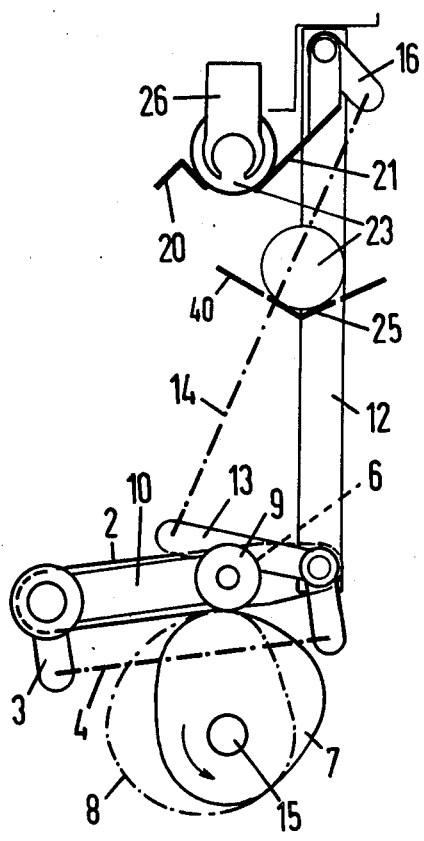
FIGS. 3, 4 and 5 are diagrammatic views similar to FIG. 1, showing the parts in different positions of their cycle of movement

FIG. 3 shows the holder halves with an egg, while the latter has been moved into the carrier.

Figure 4:
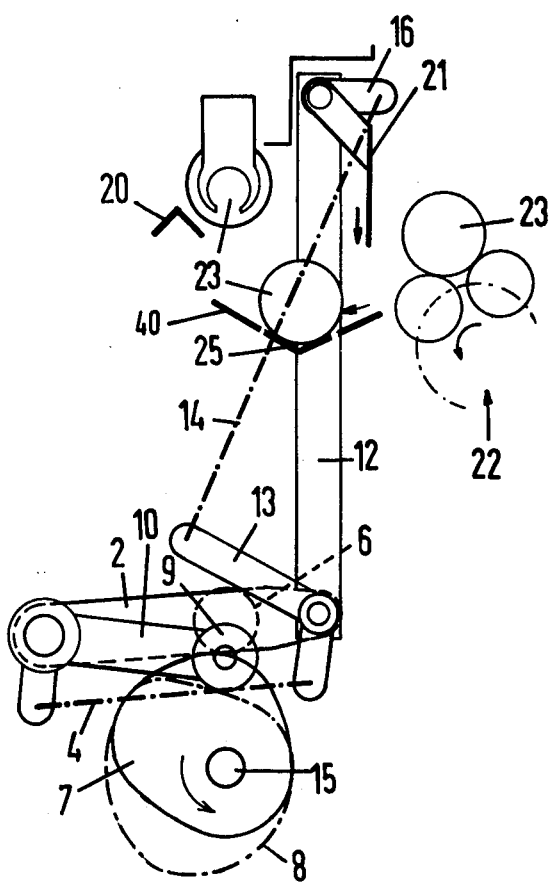
Figure 5:
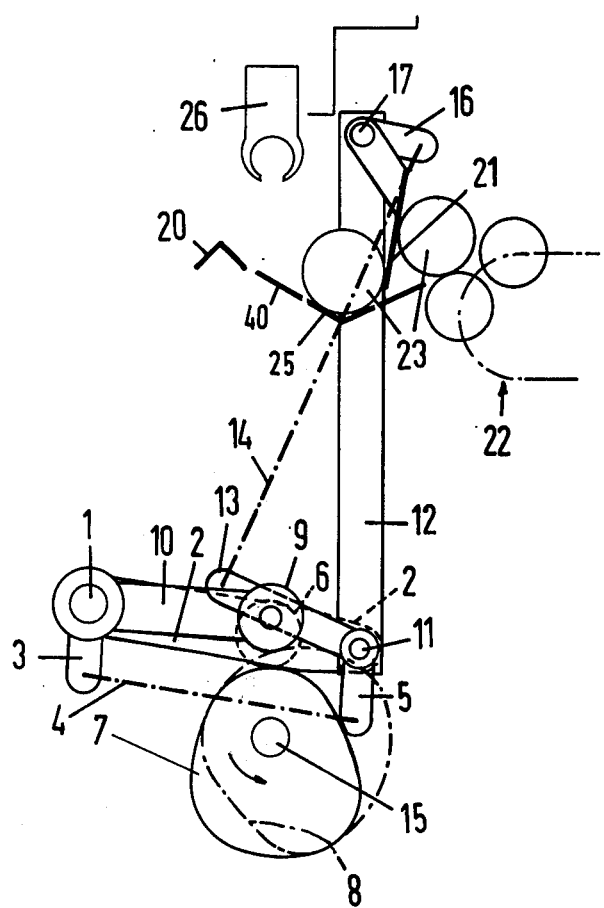

FIG. 4 shows the returned holder half 21 and holder half 20 at their initial downward movement and FIG. 5 shows the holder halves in their lowest position at the initial wiping movement of holder half 21.

For moving the holder halves from the position shown in FIG. 1 to the position shown in FIG. 3 the hinged parallellogram is lifted by cam disc 5 by means of cam follower roller 6. Consequently, shaft 11, rod 12 and hence holder half 20 and, through shaft 17, holder half 21 are moved upwardly. Owing to the fixed connection between levers 5 and 13 also lever 14 is moved upwardly, thus ensuring that holder half 21 is moved parallel to itself.

The movement from the position shown in FIG. 3 to that shown in FIG. 4 is effected by operating lever 10 via cam disc 8 and cam follower roller 9, said lever 10 again actuating lever 3. While shaft 11 remains in position, lever 5 and hence lever 13 is rotated.

For moving holder halves 20 and 21 from the position shown in FIG. 4 to that in FIG. 1 the hinged parallellogram 2, 3, 4, 5 is moved downwardly again by means of cam disc 7 and cam follower roller 6, while owing to the fixed connection between levers 5 and 13 it is ensured that holder half 21 is moved parallel to itself.

An advantage of the above operating mechanism is that the movements of the various parts can overlap, that is, a subsequent movement can start before a preceding movement has finished: by this a very short cycle time is achieved.

Furthermore it is apparent from FIGS. 4 and 5 how an egg coming from roller conveyor 22 is "caught" by the rear side of holder half 21 and, upon rotation of holder half 21, is slowly, in this instance carefully, guided into weighing scale 25. As the feeding of a subsequent egg to the weighing scale and discharging a preceding egg therefrom take place simultaneously, a maximum weighing time is achieved.

As appears furthermore from FIGS. 1 and 2, carriers 26 are suspended from a chain 28, the hinge pin rollers 29 of which are guided by a guide mounted on the frame. The operation of cams 31 is effected by rollers 32 mounted on an arm 34 rotatable about a shaft 33, the end opposite shaft 33 being hinged to a rod 35. Rod 35 is again connected to a lever 36, which is hinged to frame 27. Mounted on lever 36 is a cam follower roller 37, which is actuated by a cam disc 38 on shaft 15.

Figure 6:
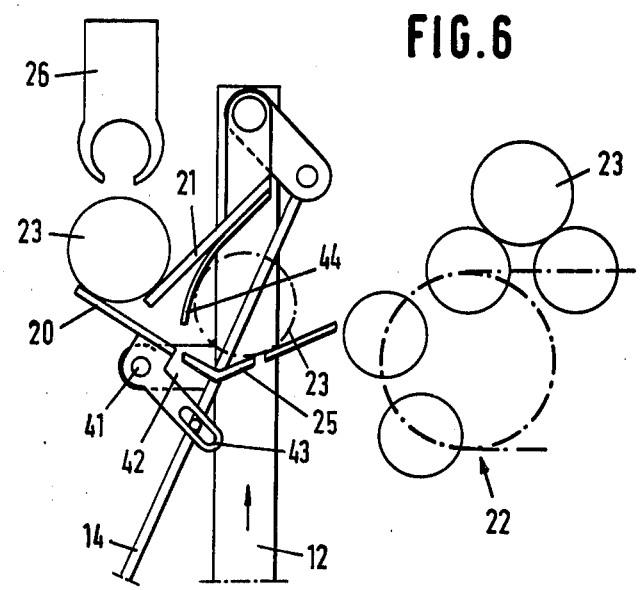
FIGS. 6, 7 and 8 are diagrammatic view similar to FIGS. 3, 4 and 5, respectively, of a second embodiment of the transfer mechanism according to the invention.
Figure 7:
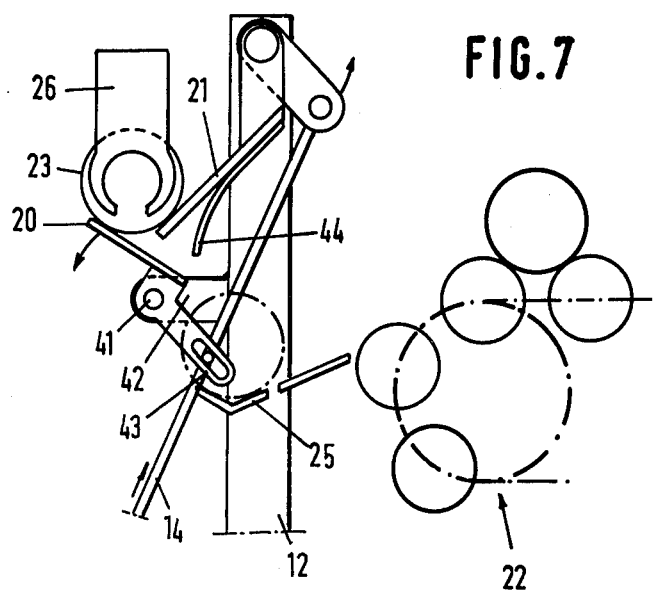
Figure 8:
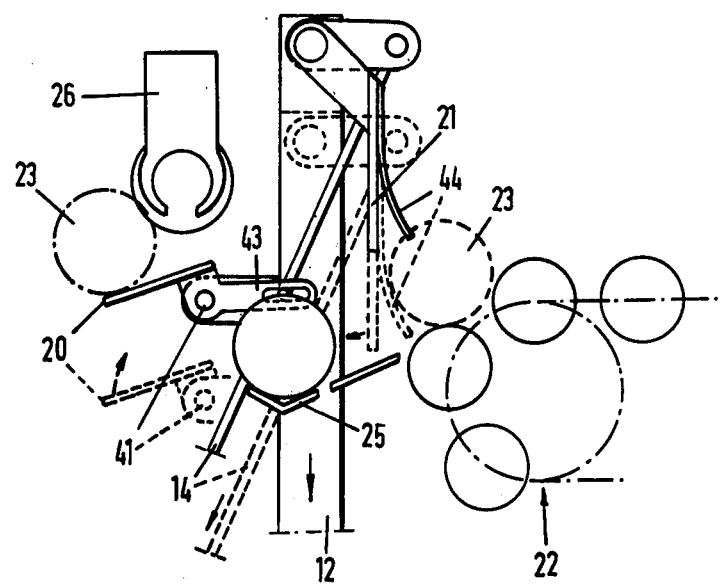

The embodiment described above in the light of FIGS. 1–5 does not appear to be fully satisfactory in actual practice. This is due to the fact that the remainders of an egg falling from carrier 26 and coming on the run-on portion 40 result in a chain reaction there. To remove this drawback, in the second embodiment shown diagrammatically in FIGS. 6, 7 and 8 the other holder half 20 is also rotatable. In FIGS. 6–8 only the parts necessary for a proper understanding of the invention are shown; the remaining parts necessary for a proper operation are fully identical to those shown in FIGS. 1–5.

As is apparent from FIGS. 6–8, the extended holder half 20 (the guideway portion 40 shown in FIGS. 1–5 is lacking here) is rotatably connected through a shaft 41 to a projection 42 secured to rod 12. An extension 43 of holder half 20 has a slot through which a pin secured to rod 14 extends. As a result, starting from the position shown in FIG. 6, holder half 20 will perform a translatory movement during its upward movement to carriers 26 (FIG. 7) after which upon rotation of holder half 21, as described above in the light of FIGS. 1–5, holder half 20 will also perform a rotary movement, namely about shaft 41 (FIG. 8). When an egg falls from a carrier 26, it rolls outwardly away from the feed path of successive eggs, thus avoiding a chain reaction. When holder half 21 subsequently "rotates back" from the lowest position of the holder halves shown in FIG. 8 in broken lines, also holder half 20 will be rotated back again to the position shown in FIG. 6.

In order to ensure smooth running of the eggs on the scale, holder half 21 is provided on the feed side with a spring leaf 44. A bent construction of the respective side of holder half 20 will also suffice, however.

I claim:

1. In apparatus for transferring eggs from a station to a carrier, said station being of the kind to receive individual eggs in sequence from a conveyor and said carrier being of the kind to carry individual eggs away from the station in sequence, the improvement comprising receiving means at said station for receiving individual eggs in sequence from a conveyor; first and second egg-holder portions located at said station, said first holder portion being mounted for rotary and translational movement and said second holder being mounted for at least translational movement; and drive means connected to said holder portions for effecting cyclical movement of said holder portions in a mode such that said first holder portion wipes an egg from said receiving means toward said second holder portion so that the egg is supported by both said holder portions and thereafter both of said holder portions move simultaneously to transfer the egg to a location at which it can be received by the carrier.

2. Apparatus as in claim 1 wherein said first holder portion is mounted so that during a part of its rotary movement it moves between an egg residing on said receiving means and an incoming egg being delivered by the conveyor.

3. Apparatus as in claim 1 wherein said drive means includes a reciprocal vertical rod, said second holder portion being fixed to said rod for translational movement therewith and said first holder portion being hinged to said rod for translational movement therewith and rotary movement relative thereto.

4. Apparatus as in claim 3 wherein said drive means includes a first cam for effecting reciprocation of said rod.

5. Apparatus as in claim 4 wherein said drive means includes a second cam for effecting rotary movement of said first holder portion.

6. Apparatus as in claim 5 wherein said drive means includes four rods hinged together in the shape of a parallelogram, one of said parallelogram rods carrying a first roller cooperating with said first cam, a lever hinged to one of the hinge points of the rod parallelogram and fixed to one of the parallelogram rods which extends from said one hinge point, said lever carrying a second roller which cooperates with said second cam.

7. Apparatus as in claim 6 wherein said drive means includes another lever hinged at one end to another of the hinge points of the rod parallelogram and fixed to one of the parallelogram rods which extends from said other hinge point, the other end of said other lever being connected by means of a connecting rod to a further lever movement of which effects rotary movement of said first holder portion.

8. Apparatus as in claim 1 wherein said drive means includes a reciprocal vertical rod, both of said holder portions being hinged to said rod for translational movement with said rod and for rotary movement relative to said rod.

9. Apparatus as in claim 8 wherein said drive means includes a first cam for effecting reciprocation of said rod.

10. Apparatus as in claim 9 wherein said drive means includes a second cam for effecting rotary movement of said first holder portion.

11. Apparatus as in claim 10 wherein said drive means includes four rods hinged together in the shape of a parallelogram, one of said parallelogram rods carrying a first roller cooperating with said first cam, a lever hinged to one of the hinged points of the rod parallelogram and fixed to one of the parallelogram rods which extends from said one hinge point, said lever carrying a second roller which cooperates with said second cam.

12. Apparatus as in claim 11 wherein said drive means includes another lever hinged at one end to another of the hinge points of the rod parallelogram and fixed to one of the parallelogram rods which extends from said other hinge point, the other end of said other lever being connected by means of a connecting rod to a further lever movement of which effects rotary movement of said first holder portion.

13. Apparatus as in claim 12 wherein said second holder portion is rotated relative to said vertically reciprocal rod by means of an extension on said second holder portion, said extension cooperating with said connecting rod.

* * * * *